United States Patent [19]

Cataldo

[11] Patent Number: 4,473,366
[45] Date of Patent: Sep. 25, 1984

[54] FLEXIBLE DRIVE BELT

[75] Inventor: Roy S. Cataldo, Birmingham, Mich.

[73] Assignee: General Motors Corporation, Detroit, Mich.

[21] Appl. No.: 369,073

[22] Filed: Apr. 16, 1982

[51] Int. Cl.³ .......................... F16G 5/16; F16G 5/00
[52] U.S. Cl. .................................. 474/242; 474/201; 474/265
[58] Field of Search ............... 474/237, 240, 242, 248, 474/265, 201, 229, 230, 231, 249, 245

[56] References Cited

U.S. PATENT DOCUMENTS

| | | | |
|---|---|---|---|
| 1,114,850 | 10/1914 | Bohlman | 474/245 X |
| 1,870,165 | 8/1932 | Bens | 474/245 |
| 2,231,920 | 2/1941 | Kelly | 474/242 |
| 2,241,820 | 5/1941 | Kohn | 474/231 X |

FOREIGN PATENT DOCUMENTS

| | | | |
|---|---|---|---|
| 65528 | 8/1947 | Denmark | 74/236 |
| 56-52647 | 5/1981 | Japan | 474/242 |

Primary Examiner—Lawrence J. Staab
Assistant Examiner—Dwight G. Diehl
Attorney, Agent, or Firm—Donald F. Scherer

[57] ABSTRACT

A flexible drive belt is comprised of a plurality of drive blocks which are assembled in a continuous loop by a plurality of tension bands extending between adjacent blocks. Each drive block has a pair of linear drive surfaces for transmitting drive forces along the straight span of the loop while being maintained in compression loading and a pair of rotary drive surfaces which frictionally engage conical surfaces of pulley members for converting the linear drive force to a rotary drive force by traversing the curved portion of the loop. Adjacent drive blocks are maintained in contact by the tension bands which operate through convex surface blocks disposed in concave surfaces formed on the drive blocks. These cooperating surfaces allow relative movement between respective drive blocks and convex surface blocks to permit the drive blocks to remain in abutment while traversing the curved portion of the continuous loop.

2 Claims, 3 Drawing Figures

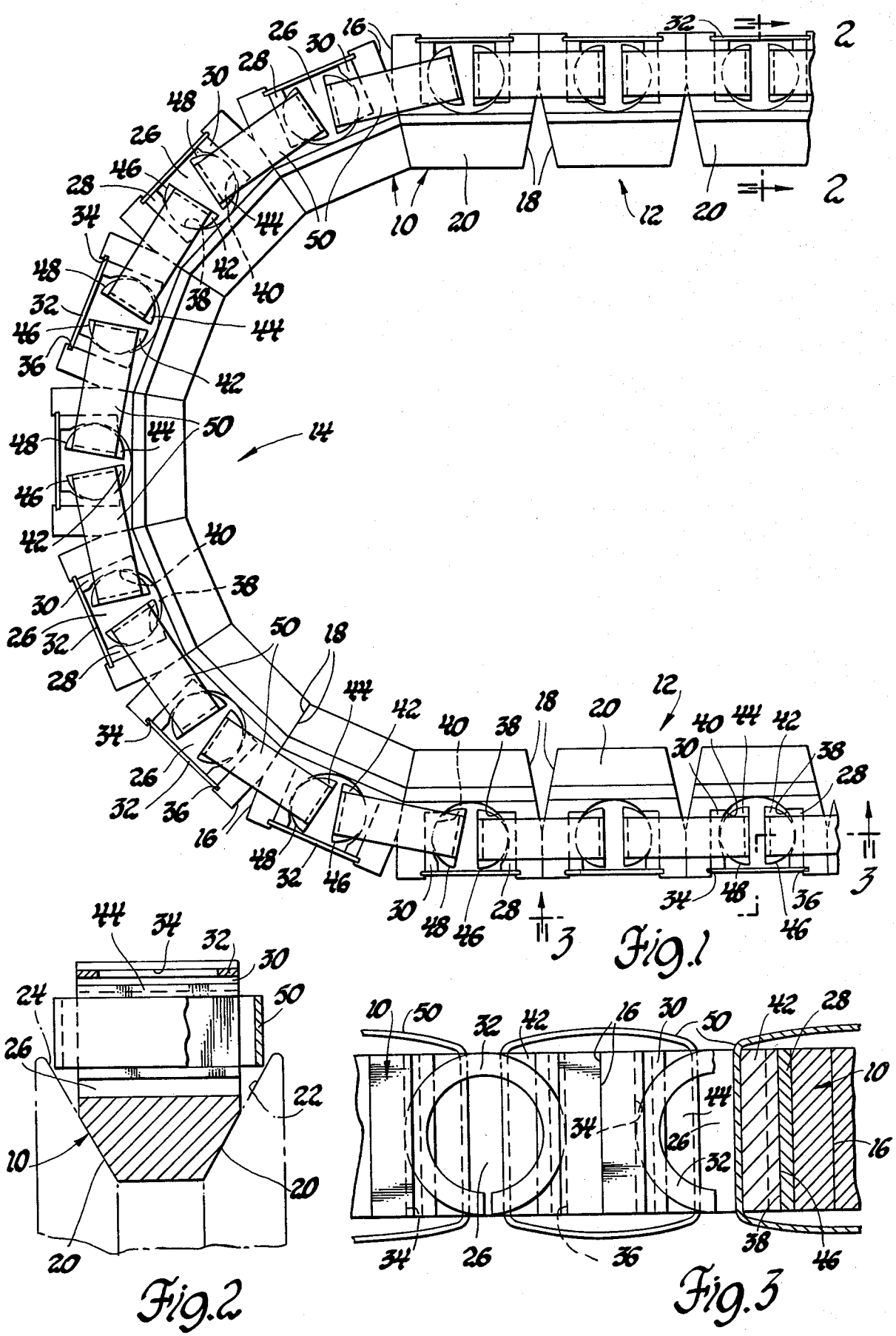

FLEXIBLE DRIVE BELT

This invention relates to flexible drive belts and more particularly to such belts which transfer drive at least partially through compression forces.

It is an object of this invention to provide an improved flexible drive transmitting belt which is formed in a continuous loop and disposed between rotary pulley members and is comprised of a plurality of block members which transmit drive forces from the drive pulley to the driven pulley at least partially by compression loading of the blocks and also wherein adjacent blocks are secured in abutting relationship through the continuous loop by tension band members.

It is another object of this invention to provide an improved flexible drive transmitting member for transmitting drive forces from a rotary drive member to a rotary driven member wherein the flexible member includes a plurality of drive blocks formed in a continuous loop to span between the rotary members with respective adjacent blocks being maintained in abutment by respective tension band members such that the blocks aligned in the linear portion of the continuous loop will be loaded in compression to transmit drive forces and the blocks traversing the curved portion of the loop will frictionally engage the respective rotary members.

These and other objects and advantages of the present invention will be more apparent from the following description and drawings in which:

FIG. 1 is an elevational view showing a portion of the drive belt;

FIG. 2 is a view taken along line 2—2 of FIG. 1; and

FIG. 3 is a view taken along line 3—3 of FIG. 1.

Referring to the drawings, wherein like characters represent the same or corresponding parts throughout the several views, there is seen a plurality of drive blocks 10 which are disposed in abutting relationship to form a continuous loop. The loop has a pair of linear spans, generally designated 12, and a pair of curved spans, one of which is shown at 14.

Each drive block 10 has a pair of linear drive transmitting surfaces 16 which are disposed in abutting relationship with adjacent drive blocks 10 along the linear spans 12. Each drive block 10 also has a pair of angled surfaces 18 formed contiguously with the linear drive transmitting surfaces 16. As seen in FIG. 1, these surfaces 16 and 18 are disposed transversely to the direction of movement of the belt.

When the blocks 10 are traversing the curved portion 14, the angled surfaces 18 will come into abutting relationship. Preferably, this abutting relationship occurs only when the curved portion 14 traverses a drive or driven pulley at the minimum drive radius.

Since the drive belt disclosed herein can be used with either a constant ratio pulley drive or a variable ratio pulley drive, it will be appreciated by those skilled in the art that these angled surfaces 18 will only be in abutting relationship in certain situations and, in fact, these angular surfaces 18 could be replaced by continuously curved surfaces. The drive blocks as seen in FIG. 2, also have angled or oblique side surfaces 20 which are adapted to frictionally engage the conical surfaces of pulley members as shown in phantom at 22 and 24. This frictional engagement causes rotation of the driven pulley in response to rotation of the drive pulley in a well-known manner.

Each drive block 10 has a central recess 26 in which is disposed a pair of guide members 28 and 30. These guide members 28 and 30 may be integrally formed with the drive block 10 or be separable members inserted in the opening 26. The guide members 28 and 30, if separable, are retained in the opening 26 by a locking ring 32 which is engaged in a pair of slots 34 and 36 formed in the block 10. Each guide member 28 and 30 has a concave surface 38 and 40, respectively, on which surfaces 38 and 40 are supported respective block or shoe members 42 and 44. Each member 42 and 44 has a convex surface 46 and 48 respectively disposed in abutting relationship with respective concave surfaces 38 and 40. The diameter of the concave surfaces 38 and 40 is greater than the diameter of convex surfaces 46 and 48.

The members 42 and 44 of respectively adjacent drive blocks 10 are urged into contact with respective guide members 28 and 30 by a tension band 50. As seen in FIG. 3, these tension bands 50 are each formed as a continuous loop and are shaped to be yieldable during assembly so that a sufficient expansion is available to permit the tension band 50 to be assembled over the end surface of the respective shoe members 42 and 44. These tension bands 50 provide the force which maintains adjacent drive blocks 10 in continuous abutment during operation in a drive transmitting system.

The tension bands 50, in cooperation with the respective concave surfaces 38 and 40 and convex surfaces 46 and 48, permit the separation of linear drive transmitting surfaces 16 when the drive transmitting member traverses the curved span 14. These tension bands 50 also exert sufficient engaging force between adjacent blocks 10 such that buckling of the flexible member under compression loading in the straight span 12 will not occur. The concave/convex surface relationship permits the belt to traverse the curved span 14 with minimum tension increase in the bands 50. This improves the fatigue life of the drive belt.

The drive blocks 10 are preferably made from a material such as steel, however, other rigid materials such as plastics, could be utilized depending upon the compression forces which occur along the straight span 12 during drive transmission. The tension bands 50 will also permit the belt to operate in a more conventional tension belt manner such as normally occurs with a rubber V-belt. However, it is believed that a more efficient drive system can be attained through the use of compression drive transmission.

The embodiments of the invention in which an exclusive property or privilege is claimed are defined as follows:

1. A flexible drive transmitting member for transmitting drive forces from a rotary drive member to a rotary driven member comprising; a plurality of drive blocks formed in a continuous loop and adapted to span between and drivingly engage said rotary members, each block including linear drive transmitting surface means and rotary drive transmitting surface means, said linear drive transmitting surface means being in abutting relation in the span between the rotary members for transmitting forces therebetween under columnar loading and said rotary drive transmitting surface means engaging said rotary drive and driven members; and block connecting means for connecting adjacent drive blocks including concave surfaces on each drive block, a pair of opposed convex surfaced blocks disposed in each drive block abutting respective concave sufaces, and a plurality of tension means encircling a portion of adjacent drive blocks and the respective opposed convex surfaced blocks disposed therein for maintaining said convex surfaced blocks in the abutting position on respective concave surfaces of adjacent drive blocks for maintaining the linear drive surfaces of adjacent drive blocks in the aforementioned abutting relation for columnar loading and for permitting angular separation of adjacent linear drive surfaces when the drive blocks are in drive relation with said rotary drive and driven members.

2. A flexible drive transmitting member for transmitting drive forces from a rotary drive member to a rotary driven member comprising; a plurality of drive blocks formed in a continuous loop and adapted to span between and drivingly engage said rotary members, each block including linear drive transmitting surface means and rotary drive transmitting surface means, said linear drive transmitting surface means being in abutting relation in the span between the rotary members for transmitting forces therebetween under columnar loading and said rotary drive transmitting surface means engaging said rotary drive and driven members; and block connecting means for connecting adjacent drive blocks including a pair of guide members on each drive block with each guide member having a concave surface, convex surfaced blocks disposed in each guide member abutting respective concave surfaces, and a plurality of tension belt means each encircling a portion of respective adjacent drive blocks and said convex surface blocks associated therewith for maintaining said convex surfaces blocks in the abutting position on respective guide members, concave surfaces of adjacent drive blocks for maintaining the linear drive surfaces of adjacent drive blocks in the aforementioned abutting relation for columnar loading and for permitting separation of adjacent linear drive surfaces when the drive blocks are in drive relation with said rotary drive and driven members.

* * * * *